United States Patent
Nader et al.

(10) Patent No.: US 9,661,639 B2
(45) Date of Patent: May 23, 2017

(54) ADAPTIVE FILTER USED FOR RADIO RESOURCE MANAGEMENT

(71) Applicant: Optis Circuit Technology, LLC, Plano, TX (US)

(72) Inventors: Ali Nader, Mälmo (SE); Bengt Lindoff, Bjärred (SE)

(73) Assignee: Optis Circuit Technology, LLC, Plano, TX (US)

( * ) Notice: Subject to any disclaimer, the term of this patent is extended or adjusted under 35 U.S.C. 154(b) by 0 days.

(21) Appl. No.: 14/363,086

(22) PCT Filed: Dec. 12, 2012

(86) PCT No.: PCT/EP2012/075188
§ 371 (c)(1),
(2) Date: Jun. 5, 2014

(87) PCT Pub. No.: WO2013/092333
PCT Pub. Date: Jun. 27, 2013

(65) Prior Publication Data
US 2014/0335880 A1 Nov. 13, 2014

Related U.S. Application Data

(60) Provisional application No. 61/608,270, filed on Mar. 8, 2012.

(30) Foreign Application Priority Data

Dec. 22, 2011 (EP) ...................................... 11195271
Mar. 8, 2012 (EP) ...................................... 12158526

(51) Int. Cl.
*H04W 72/08* (2009.01)
*H04W 72/10* (2009.01)
(Continued)

(52) U.S. Cl.
CPC .......... *H04W 72/08* (2013.01); *H04B 17/327* (2015.01); *H04W 52/50* (2013.01);
(Continued)

(58) Field of Classification Search
CPC . H04W 36/0083; H04W 88/06; H04W 24/10; H04W 36/32; H04W 36/04;
(Continued)

(56) References Cited

U.S. PATENT DOCUMENTS 9,161,343 B2 * 10/2015 Koo .................. H04W 72/1215
2007/0191013 A1 * 8/2007 Gunnarsson et al. ........ 455/438
(Continued)

OTHER PUBLICATIONS

International Search Report issued in corresponding International application No. PCT/EP2012/075188, date of mailing Mar. 26, 2013.

(Continued)

*Primary Examiner* — Liton Miah
(74) *Attorney, Agent, or Firm* — Spencer C. Patterson; Grable Martin Fulton PLLC

(57) ABSTRACT

An apparatus (300) for use in a telecommunications system is disclosed. The apparatus (300) comprises a memory (340) and a controller (310). The apparatus (300) is configured to receive a radio frequency signal (150), determine an operating parameter and adapt a first filter function according to at least said operating parameter. The apparatus (300) is further configured to generate a filtered signal (720, 820, 730, 830) by applying said first filter function to a signal associated with the received radio frequency signal and provide said filtered signal (720, 82, 70, 830) for radio resource management.

16 Claims, 7 Drawing Sheets

(51) Int. Cl.
*H04W 52/50* (2009.01)
*H04B 17/327* (2015.01)
*H04B 1/06* (2006.01)
*H04W 36/00* (2009.01)
*H04B 17/309* (2015.01)

(52) U.S. Cl.
CPC ............... *H04W 72/10* (2013.01); *H04B 1/06* (2013.01); *H04B 17/309* (2015.01); *H04W 36/0083* (2013.01)

(58) Field of Classification Search
CPC . H04W 36/0055; H04W 36/14; H04W 36/18; H04W 36/0072; H04W 36/0094; H04W 36/08; H04W 36/24
See application file for complete search history.

(56) References Cited

U.S. PATENT DOCUMENTS

| | | | |
|---|---|---|---|
| 2010/0298001 A1* | 11/2010 | Dimou et al. | 455/441 |
| 2011/0026484 A1* | 2/2011 | Fox et al. | 370/331 |
| 2012/0115463 A1* | 5/2012 | Weng et al. | 455/425 |
| 2012/0214540 A1* | 8/2012 | Narasimha | H04W 36/30 455/525 |

OTHER PUBLICATIONS

Written Opinion of the International Searching Authority issued in corresponding International application No. PCT/EP2012/075188, date of mailing Mar. 26, 2013.

Zhang, Haijun et al., "A Novel Self-optimizing Handover Mechanism for Multi-service Provisioning in LTE-Advanced," 2009 International Conference on Research Challenges in Computer Science, IEEE, Piscataway, NJ, USA, Dec. 28, 2009, pp. 221-224, XP031620752, ISBN: 978-0-7695-3927-0.

3GPP, 3rd Generation Partnership Project; Technical Specification Group Radio Access Network; Evolved Universal Terrestrial Radio Access (E-UTRA); Requirements for support of radio resource management (Release 10), 3GPP Standard, 3GPP TS 36.133, 3rd Generation Partnership Project (3GPP), Mobile Competence Centre, 650, Route des Lucioles, F-06921 Sophia-Antipolis Cedex, France, No. V10.1.0, Jan. 6, 2011, pp. 1-402, XP050462572.

Ericsson, "Correction of UE measurement model," 3GPP Draft; 36300 CRXXX Rel-8) R2-092099, 3rd Generation Partnership Project (3GPP), 3GPP TSG RAN WG2 meeting #65bis, Mobile Competence Centre, 650, Route des Lucioles, F-06921 Sophia-Antipolis Cedex, France, No. Seoul, Korea, Mar. 23-27, 2009, XP050339782.

* cited by examiner

ADAPTIVE FILTER USED FOR RADIO RESOURCE MANAGEMENT

TECHNICAL FIELD

This application relates to an apparatus, a method and a computer program product for filtering of signals for improved radio resource management, and in particular to an apparatus, a method and a computer program product for adaptive filtering of signals for improved radio resource management.

BACKGROUND

Mobile communications, such as mobile telephony, is a technology that is continuously gaining an increased user base. Similarly, as new technologies emerge, they will co-exist with older standards. Furthermore, different geographical areas have different communication standards and spectrum planning. As a User Equipment (UE), such as a mobile telephone is switched on it searches for available network carriers according to a stored history list of Radio Access Technologies (RAT) and carriers. This list is matched against any signal that is received at a present location and allows the UE 100 to connect to one of the network carriers that are in the list. To maintain a high quality connection, a user equipment (UE) is adapted to perform Radio Resource Management (RRM) related measurements. More specifically, the UE performs measurements on its serving cell and neighboring cells (potentially on different frequencies and/or Radio Access Technologies) to determine a received signal power (e.g. WCDMA RSCP (Wideband Code Division Multiple Access Received Signal Code Power), LTE RSRP (Long Term Evolution Reference Signal Received Power) both defined in the 3GPP ($3^{Rd}$ Generation Partnership Project) standard) and/or quality (e.g. WCDMA EcN0, LTE RSRQ (Reference Signal Received Quality) also defined in 3GPP) of a signal from a base station. These measurements may, for example, be used to determine whether a handover from a first base station to a second base station should be executed.

FIG. 1 shows a schematic view of a user equipment (UE) 100, such as a mobile communications device, for example a mobile telephone present in a general network environment. The UE 100 is schematically illustrated in FIG. 1 and it should be noted that a UE 100 comprises various functional components, such as a controller, a memory, a user interface and a radio interface to name a few, that are not illustrated in FIG. 1. Such functional components will be described further on with reference to FIGS. 2 and 3. The UE 100 comprises an apparatus 110 comprising a first layer Layer 1 120 and a third layer Layer 3 130. The first layer 120 and the third layer 130 are, in one embodiment, part of a communication model, such as an Open Systems Interconnection (OSI) model. In FIG. 1 a first base station 160 and a second base station 165 are shown. The first base station 160 and the second base station 165 are adapted to each emit a radio frequency signal 150, 155. The first layer 120 of the apparatus 110 is operably connected to a radio antenna 140 for receiving a radio signal 150, 155 from a base station 160, 165 for performing the measurements. In one embodiment the communication model is at least partly comprised in a radio frequency interface.

Depending on the state of the UE 100 (e.g. Idle or Connected), these measurements may be used internally to decide if a cell reselection should be performed and if so, the proper cell to reselect to. Alternatively, the measurements may be reported to the network (NW), through a base station 160, 165, wherein decisions are taken whether the UE 100 shall be handed over to another cell or not and if so, the proper cell to hand over to is selected. In a typical scenario, should a second signal 155 from a second base station 165, that is stronger than the first signal 150 from the first base station 160 currently selected, be detected, a hand over to the second base station 165 having the stronger signal 155 might be performed. However, if the second signal 155 is only strong for a short while, perhaps as when a vehicle carrying a UE 100 passes a short-range base station, the second signal 155 will only be strong for a short time. This will result in that the UE 100 will be handed over to the second base station 165 for only a short time and as the second signal 155 grows weaker the UE 100 will be handed over back to the first base station 150. This causes an unnecessary use of system resources such as bandwidth, computational power and also battery power of the UE 100. In order to avoid such a trigger-happy system, the aforementioned measurements are often smoothed by filter(s) before they are acted upon. As an example, in 3GPP (both for WCMDA and LTE) there are two filters defined; one implementation-dependant Layer 1 filter and one specified Layer 3 filter that filters the output from the Layer 1 filter before any action is taken.

Contemporary filters used for RRM-related measurements may be based on traditional filters, for example Finite Impulse Response (FIR) filters and Infinite Impulse Response (IIR) filters known in the prior art. As an example, one such generic Layer 3 filter is specified in 3GPP (WCDMA 25.331, LTE 36.331) to be applied on cellular measurements before a report is submitted to the NW by the UE 100. The filter is specified as:

$$F(n)=(1-a)F(n-1)+a\ M(n)$$

where:
F(n) is the updated filtered measurement result
F(n−1) is the old filtered measurement result
M(n) is the latest received measurement result from physical layer measurements
a is a coefficient configured by the NW (typical value range 0 . . . 1)

The measurement M(n) is in turn a Layer 1 filtered version of the received signal strength. The L1 filter is implementation dependent and could either be a FIR filter $$M(n)=(1/N)\text{sum}\_\{i=0\}^\{N-1\}Y(n-i)$$

Or an IIR filter $$M(n)=(1-b)M(n-1)+b\ Y(n)$$

Where Y is the signal strength/quality estimate and N is the number of samples that M(n) is filtered over for a FIR implementation. The filter coefficient b is the corresponding time constant in case of IIR implementation. In a typical embodiment, b or N as applicable may be chosen such that the time constant is around 200 ms.

In FIG. 1 an example relationship between Y(n), M(n) and F(n) is illustrated with the arrows marked Y, M and F respectively.

There is a trade-off for a UE on how much it should filter its RRM related measurements. The more or harder a UE filters its measurements (e.g. the filter coefficients a and/or b (or 1/N) are set to low values), the less responsive it will be to surrounding radio environments with the possibility of experiencing loss of coverage, miss incoming calls etc. On the other hand, the less or softer a UE filters its measurements (e.g. the filter coefficients a and/or b (or 1/N) are set to high values), the more responsive it will be to the surrounding radio environments and the UE will react faster to changes or, in other words, the UE will be more inclined to changing cells (trigger-happy), flooding the network with measurement reports, etc.

As a result, in the 3GPP L3 filter example above, the network configures the filter (i.e. configures the coefficient a) in a generic manner that must serve "okay", that is provide an acceptable signal quality, in all scenarios. This will typically give rise to problems in specific scenarios, where the "average" or generic choice of the filter coefficient or parameter a is not satisfactory. According to the standards the coefficient a can assume values in the range 0 to 2, commonly in the range 0 to 1, a typical value being a=0.7.

The American patent application US2011103350 discloses a cellular communication system that has an air interface divided into frames, each consisting of sub-frames at least two of which are synchronization sub-frames. For each cell, different cell-related synchronization signals are transmitted to user equipments (UEs) in different synchronization signal sub-frames. The UE detects cell identities of first and second cells. Weights then control generation of weighted handover measurements made from the first cell's synchronization signals received during synchronization sub-frames, wherein each of the weights is a function of the cell identity of the first cell, the cell identity of the second cell, and which ones of the first and second cells' cell-related synchronization signals are transmitted in the respective one of the plurality of synchronization sub-frames during which the weight is applied. A filtered handover measurement, upon which a handover decision can be made, is generated from the weighted handover measurements. This system thus adapts the weights for the synchronization signals depending on the CellID only.

There is thus a need for a method, an apparatus to be implemented in a UE and a computer program product that improves RRM measurement filtering. For example, there is a need for a method, an apparatus to be implemented in a UE and a computer program product for alleviating the above mentioned short comings with the Network decided L3 filter parameter choice.

SUMMARY

It is an object of the teachings of this application to overcome the problems listed above by providing an apparatus for use in a telecommunications system. The apparatus comprises a memory and a controller, wherein said apparatus is configured to: receive a radio frequency signal, determine an operating parameter, adapt a first filter function according to at least said operating parameter, generate a filtered signal by applying said first filter function to a signal associated with the received radio frequency signal, and provide said filtered signal for radio resource management.

The prior art filters, although suitable in many applications, do not consider specific characteristics of signals broadcast from base stations nor do they take into account environmental network considerations or parameters, such as cell load for example. The underlying concept of the teachings herein is to have a better logic (compared to the ones defined in for example the 3GPP specifications) when it comes to filtering RRM-related measurements. The concept is based on adapting parameters of the RRM filters considering the current radio scenario or environment, such as taking into account variations (e.g. derivative or trend) in the received signal strength, carrier frequency, Radio Access Technology (such as TDD, WCDMA or LTE) and/or type of cells being measured (serving cell, cell in active set or neighboring cell).

It should be noted that the RRM filters according to herein are applicable to any of or both the Layer 1 filter and the Layer 3 filter. The RRM filters according to herein are also applicable to a single filter replacing the Layer 1 filter and the Layer 3 filter. It should also be noted that the filters according to herein are applicable to any other type of filter (not mentioned in the examples herein) used for RRM related measurements.

In one embodiment the apparatus is further configured to detect a change in said operating parameter and to adapt a filter function according to the change in real-time. This allows the apparatus to react to changes in the network environment and to changes in operating conditions swiftly.

In one embodiment the apparatus is further configured to adapt said filter function by changing a filter coefficient. This provides for a simple and elegant manner of changing the characteristics of the filtering function and that is easy to implement.

In one embodiment the apparatus is further configured to adapt a second filter function according to an operating parameter and apply said second filter function to said filtered signal. This allows the apparatus to adapt more than one filter. For example, the adaptation can be performed on either or both of the Layer 1 filter and the Layer 3 filter or to a filter replacing them both.

In one embodiment the apparatus is further configured to determine whether a received signal strength of said received radio frequency signal is increasing or decreasing and adapt said filter function accordingly. This allows the apparatus to adapt the filter to handle a signal that is coming into range and/or ne that is going out of range. It also allows the apparatus to compensate for and handle temporary fluctuations in signal strength In one embodiment the apparatus is further configured to adapt said first filter function for a first measured cell that said received radio frequency signal is received from and adapt a second filter function for a second measured cell that a second radio frequency signal is received from. This allows the apparatus to filter signals differently depending on which cell they originate from.

In one embodiment the operating parameter is related to at least one of carrier frequency, number of cells in an active set, Radio Access Technology, difference between a first and a second measurement of the received radio frequency signal (150), difference between a measurement of the received radio frequency signal (150) and a filtered signal (720, 820), primary cell, secondary cell, serving cell, detected cell. This allows the apparatus to adapt the filter function to different operating parameters thereby providing a flexible filter adaptation.

In one embodiment the apparatus is further configured to, for an operating parameter relating to carrier frequency, adapt said first filter function using a first filter time constant for a first carrier frequency and adapt said first filter function using a second filter time constant for a second carrier frequency, wherein the first carrier frequency is lower than the second carrier frequency and the first filter time constant is higher than the second filter time constant. This allows the apparatus to take into account that lower carrier frequencies generally have larger coverage areas.

In one embodiment the apparatus is further configured to, for an operating parameter relating to primary and secondary cells, adapt said first filter function using a first filter time constant for a primary cell and adapt said first filter function using a second filter time constant for a secondary cell, wherein the first filter time constant is lower than the second filter time constant. This allows the apparatus to maintain a stable connection with a primary cell, while trying to optimize a connection with a secondary cell.

In one embodiment the apparatus is further configured to, for an operating parameter relating to radio access technologies, determine a priority of a radio access technology and adapt said first filter function using a first filter time constant for a first priority of a radio access technology and adapt said first filter function using a second filter time constant for a second priority of a radio access technology, wherein the first priority of a radio access technology is higher than the second priority of a radio access technology and the first filter time constant is higher than the second filter time constant. This allows the apparatus to prioritize one cell over another cell.

In one embodiment the apparatus is further configured to, for an operating parameter relating to a difference between a first and a second measurement of the received radio frequency signal, track said difference for a number of samples and determine whether the difference is consistent, and, if so, adapt said filter function accordingly. This allows the apparatus to avoid that short fluctuations influence the filtering function.

In one embodiment the apparatus is comprised in a mobile communications terminal, such as a mobile telephone, an internet tablet, a personal digital assistant or a netbook (or laptop) computer It is a further object of the teachings herein to provide a method for use in a telecommunications system. The method It is a further object of the teachings herein to solve the above-mentioned problems by providing a method for use in a telecommunications system said method comprising: receiving a radio frequency signal, determining an operating parameter, adapting a first filter function according to at least said operating parameter, generating a filtered signal by applying said first filter function to a signal associated with the received radio frequency signal, and providing said filtered signal for radio resource management.

In one embodiment the method further comprises determining whether a received signal strength of said received radio frequency signal is increasing or decreasing and adapting said filter function accordingly. The method shares the same benefits and advantages as the apparatus.

It is a further object of the teachings herein to provide a computer program product and a computer readable storage medium encoded with instructions that, when executed on a processor, performs the method according to above.

At least some of the teachings herein may find beneficial use in an apparatus, such as a circuit, to be comprised in a user equipment, such as a mobile telecommunications device for example being a mobile telephone, a wireless modem, a Personal Digital Assistant or any mobile device capable of wireless telecommunication in a telecommunications system according to a RAT. Examples of such telecommunications systems are systems adhering to standards for example governed by the standardization body 3GPP ($3^{rd}$ Generation Partnership Project), such as LTE (long Term Evolution), LTE Advanced, GSM (Global System for Mobile Communications), GPRS (General Packet Radio Service), EDGE (Enhanced Data rates for GSM Evolution), or UMTS (Universal Mobile Telecommunications System), to name a few. Such telecommunications systems may be implemented using RATs such as TDMA (Time Division Multiple Access), WCDMA (Wideband Code Division Multiple Access), TDD (Time Division Duplex), FDD (Frequency Division Duplex), OFDM (Orthogonal Frequency Division Multiplexing), WCDMA/TD-SCDMA (WCDMA Synchronous CDMA and Time Division WCDMA Synchronous CDMA), to name a few.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The actions of any method disclosed herein do not have to be performed in the exact order disclosed, unless explicitly stated.

BRIEF DESCRIPTION OF DRAWINGS

Embodiments of the invention will be described in further detail under reference to the accompanying drawings in which:

FIG. 9 shows a flowchart for a method according to one embodiment of the teachings of this application; and.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete. Like numbers refer to like elements throughout.

Figure 2:
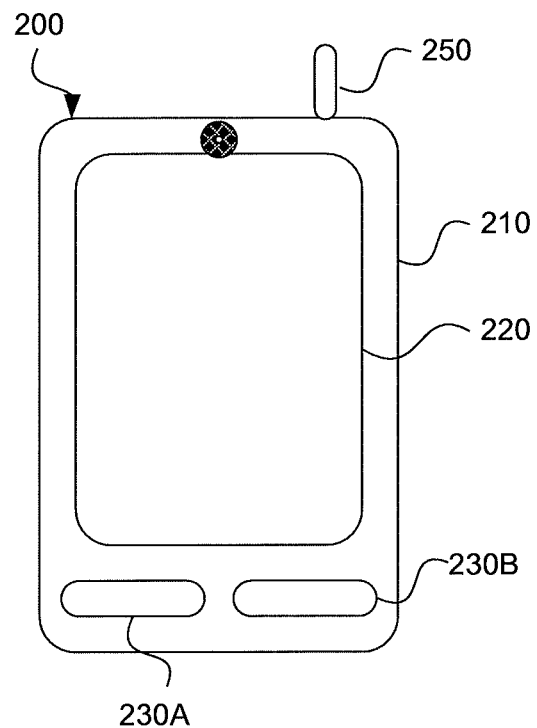
FIG. 2 shows a schematic view of a mobile telecommunications device comprising an apparatus according to one embodiment of the teachings of this application.

FIG. 2 shows a schematic overview of a mobile communications device 200 adapted according to the teachings herein. In the embodiment shown the mobile communications device is a mobile phone 200. In other embodiments the mobile communications device 200 is a personal digital assistant, a media player or any (hand-held or portable) device capable of communicating with other devices over a telecommunications system. The mobile communications device 200 can also be a modem or a laptop computer having telecommunications capabilities. The mobile phone 200 comprises a housing 210 in which a display 220 is arranged. In one embodiment the display 220 is a touch display. In other embodiments the display 220 is a non-touch display. Furthermore, the mobile phone 200 comprises two keys 230a, 230b. In this embodiment there are two keys 230, but any number of keys is possible and depends on the design of the mobile phone 200. In one embodiment the mobile phone 200 is configured to display and operate a virtual key on the touch display 220. It should be noted that the number of virtual keys are dependant on the design of the mobile phone 200 and on an application that is executed on the mobile phone 200. In one embodiment the device 200 comprises an ITU-T keypad or a QWERTY (or equivalent) keypad in addition to or as an alternative to a touch-sensitive display. In an embodiment where the keypad is an alternative to a touch-sensitive display, the display 220 is a non-touch-sensitive display. The UE 200 further comprises a Radio Frequency (RF) antenna 250 which forms part of a RF interface (not shown). The radio interface is adapted to receive and transmit radio frequency signals through the antenna through the use of different radio frequency technologies or systems. Examples of such technologies are W-CDMA, GSM, UTRAN, LTE, NMT to name a few.

Figure 3:
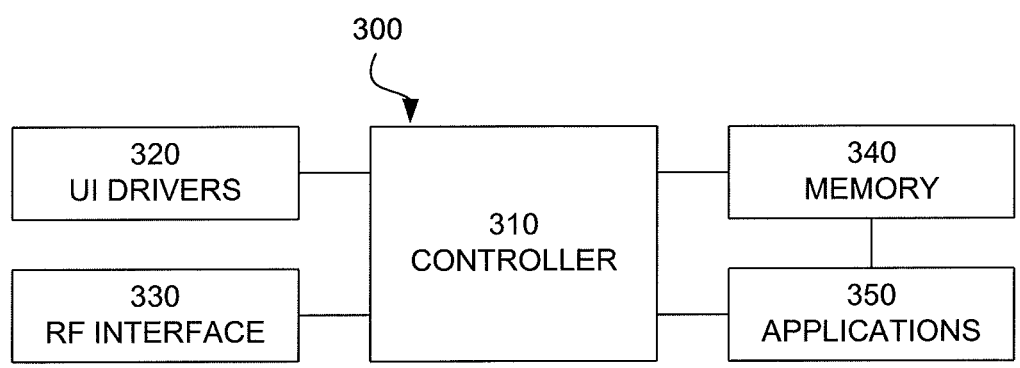
FIG. 3 shows a schematic view of the general structure of an apparatus according to one embodiment of the teachings of this application.

FIG. 3 shows a schematic view of the general structure of an apparatus that can be comprised in a device according to FIG. 2. The apparatus can be an electronic circuit, such as an ASIC (Application Specific Integrated Circuit) or an arrangement of electronic circuits. The apparatus 300 comprises a controller 310 which is responsible for the overall operation of the apparatus 300 and may for example be implemented by any commercially available CPU ("Central Processing Unit"), DSP ("Digital Signal Processor") or any other electronic programmable logic device. The controller 310 may also be implemented by a combination of such processors or other electronic programmable logic device. The controller 310 may be implemented using instructions that enable hardware functionality, for example, by using executable computer program instructions in a general-purpose or special-purpose processor that may be stored on a computer readable storage medium (disk, memory etc) 340 to be executed by such a processor. The controller 310 is configured to read instructions from the memory 340 and execute these instructions to control the operation of the apparatus 300. The memory 340 may be implemented using any commonly known technology for computer-readable memories such as ROM, RAM, SRAM, DRAM, CMOS, FLASH, DDR, EEPROM memory, flash memory, hard drive, optical storage or any combination thereof. The apparatus 300 further comprises one or more applications 350. The applications are sets of instructions that when executed by the controller 310 control the operation of the apparatus 300. The memory 340 is used for various purposes by the controller 310, one of them being for storing application data and application instructions 350 for various software modules in the apparatus 300. The software includes a real-time operating system and possibly drivers for a man-machine interface 320 and an application handler as well as various applications 350. The applications 350 may relate to functions of a device incorporating the apparatus 300, such as the mobile telecommunications device 100, and can include a messaging application for short messaging service (SMS), multimedia messaging service (MMS) and electronic mail, a media player application, as well as various other applications 350, such as applications for voice calling, video calling, web browsing, document reading and/or document editing, an instant messaging application, a phonebook application, a calendar application, a control panel application, one or more video games, a notepad application, location finding applications, etc.

The apparatus 300 may further comprise user interface drivers 320 adapted to operate with a user interface, which user interface in the mobile device 200 of FIG. 2, comprises the display 220, the keys 230, 23, a microphone and a loudspeaker. The user interface drivers 320 also include one or more hardware controllers, which together with the UI drivers cooperate with the display 220, and the keypad 230 as well as with various other I/O devices such as the microphone, a speaker, a vibrator, a ringtone generator, an LED indicator, etc. As is commonly known, the user may operate the mobile telecommunications device 200 and the apparatus 300 through the man-machine interface thus formed.

The apparatus 300 further comprises a radio frequency interface 330, which is adapted to allow the mobile device to communicate with other devices through a radio frequency band through the use of different radio frequency technologies. Examples of such technologies are W-CDMA, GSM, UTRAN, LTE, NMT to name a few. The controller 310 is configured to operably execute communication applications 350 such as the voice call and SMS applications through the RF interface 330, and optionally a Bluetooth interface and/or an IrDA interface for local connectivity, and software stored in the memory 340, which software includes various modules, protocol stacks, drivers, etc, to provide communication services (such as transport, network and connectivity) for the apparatus 300. The RF interface 330 comprises an internal or external antenna as well as appropriate radio circuitry for establishing and maintaining a wireless link to a base station. As is well known to a person skilled in the art, the radio circuitry comprises a series of analogue and digital electronic components, together forming a radio receiver and transmitter. These components include, i.e., band pass filters, amplifiers, mixers, local oscillators, low pass filters, AD/DA converters, etc.

Figure 4:
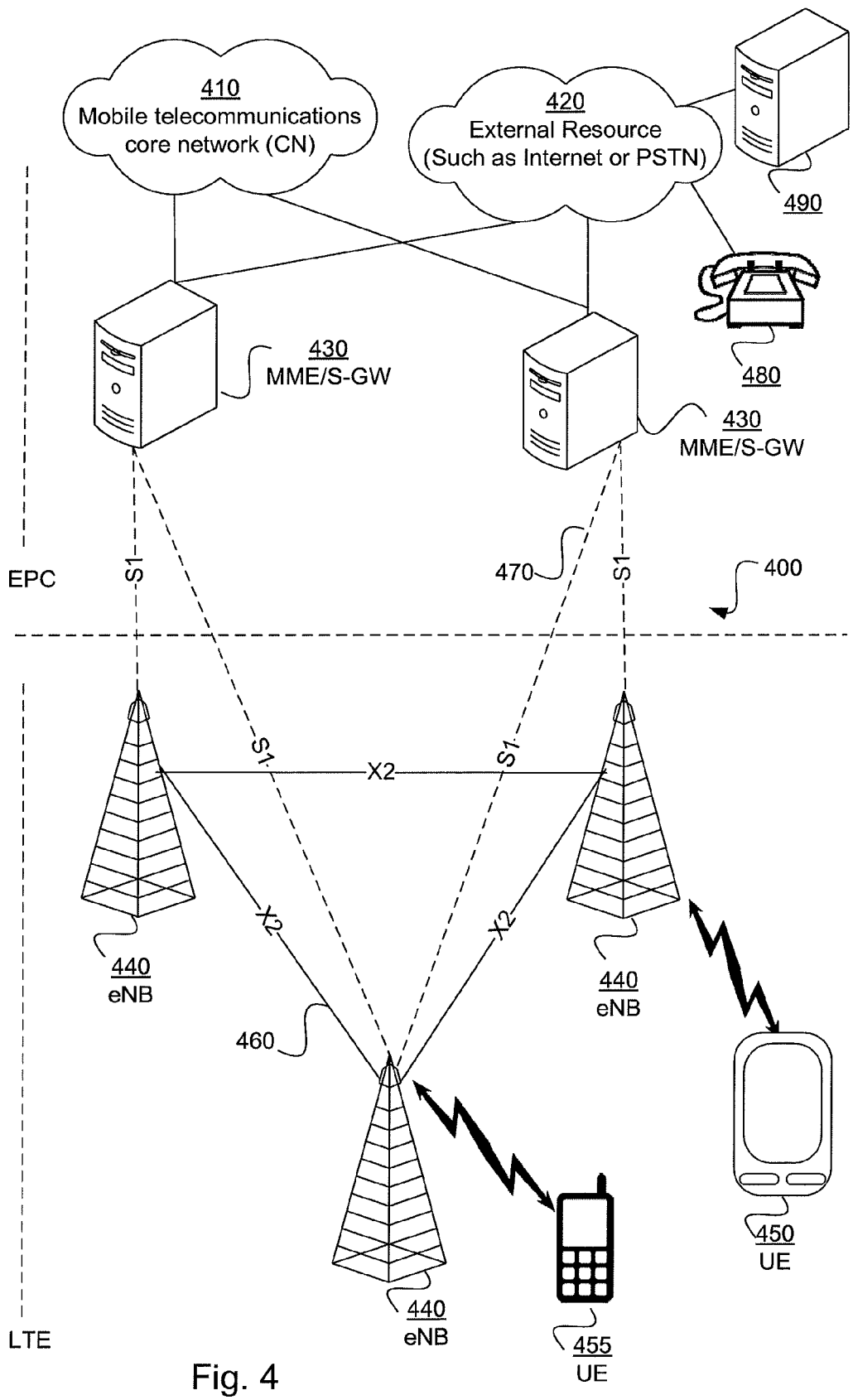
FIG. 4 shows a schematic view of a telecommunications system comprising an apparatus according to one embodiment of the teachings of this application.

FIG. 4 shows a schematic view of the general structure of a telecommunications system 400 according to the teachings herein. In the telecommunication system of FIG. 4, various telecommunications services such as cellular voice calls, www/wap browsing, cellular video calls, data calls, facsimile transmissions, music transmissions, still image transmissions, video transmissions, electronic message transmissions and electronic commerce may be performed between a mobile terminal 200, 450 according to the disclosed embodiments and other devices, such as another mobile terminal 455 or a stationary telephone 480. The mobile terminals 450, 455 are connected to a mobile telecommunications network 410 through Radio Frequency links via base stations 440.

The telecommunications system 400 comprises at least one server 430. A server 430 has a data storage and a controller, for example implemented by any commercially available CPU ("Central Processing Unit"), DSP ("Digital Signal Processor") or any other electronic programmable logic device. In one embodiment such a server is a Mobility Management Entity (MME) and/or a Gateway (GW). In FIG. 4 two such servers 430 are shown. The servers 430 are configured to communicate with a mobile telecommunications core network (CN) 410 and/or an external resource 420 such as the Internet or a Public Switched Telephone Network (PSTN). A PSTN 420 is configured to communicate with and establish communication between stationary or portable telephones 480. In one embodiment the external resource comprises or is configured to communicate with an external service provider 490. In one embodiment the servers 430 are configured to communicate with other devices using a packet switched technology or protocol. In such an embodiment the servers 430 may make up an Evolved Packet Core (EPC) layer.

The servers are configured to communicate with nodes, also referred to as base stations 440. In one embodiment the base station 440 is an evolved Node Base (eNB). A base station 440 is further configured to communicate with one or more servers 430. In one embodiment the communication between a server 430 and a base station 440 is effected through a standard or protocol 470. In one embodiment the protocol is S1. A base station 440 is configured to communicate with at least one other base station 440. In one embodiment the communication between a base station 440 and another base station 440 is effected through a standard or protocol 460. In one embodiment the protocol 460 is X2. A base station, such as the base station 440 in FIG. 4, is further configured to handle or service a cell. In one embodiment the at least one base stations 440 make up a Long Term Evolution (LTE) layer. In one embodiment the at least one base stations 440 make up an LTE Advanced layer.

In one embodiment the base station 440 is configured to communicate with a mobile telecommunications device 450 (200) through a wireless radio frequency protocol.

In one embodiment the telecommunications system 400 is an Evolved Packet System (EPS) network. In one embodiment the telecommunications system is a system based on the 3GPP ($3^{rd}$ Generation Partnership Project) standard. In one embodiment the telecommunications system is a system based on the UMTS (Universal Mobile Telecommunications System) standard. In one embodiment the telecommunications system is a system based on a telecommunications standard such as WCDMA, GSM, D-AMPS, CDMA2000, FOMA or TD-SCDMA to name a few. In an embodiment where the telecommunications system is a W-CDMA system the servers 430 of FIG. 4 may be Radio Network Controllers.

The description below will be focused on that an adaptive filter is implemented for the Layer 1 (L1) filter, however the description should not be construed as to be limited to that case. The adaptation could equally well be implemented in the Layer 3 (L3) filter or in both filters. In one embodiment the L1 filter and the L3 filter are combined to a single filter.

The apparatus 300 is configured to adapt one or more filter coefficients in order to maintain an advantageous connection with a base station 160, 165, 440. Examples of such coefficients are a and/or b and/or 1/N from the filter specifications given in the background section of this application and/or any other filter coefficient suitable for an adaptation according to the teachings herein.

In the following, reference will often be made to a/the filter coefficient. This formulation should not exclude involvement and/or adaptation of more than one coefficient. Furthermore, references to setting a higher/lower value of coefficient, for example a, are to be considered as examples merely and do not exclude corresponding adaptation of one or more other filter coefficients.

Figure 5:
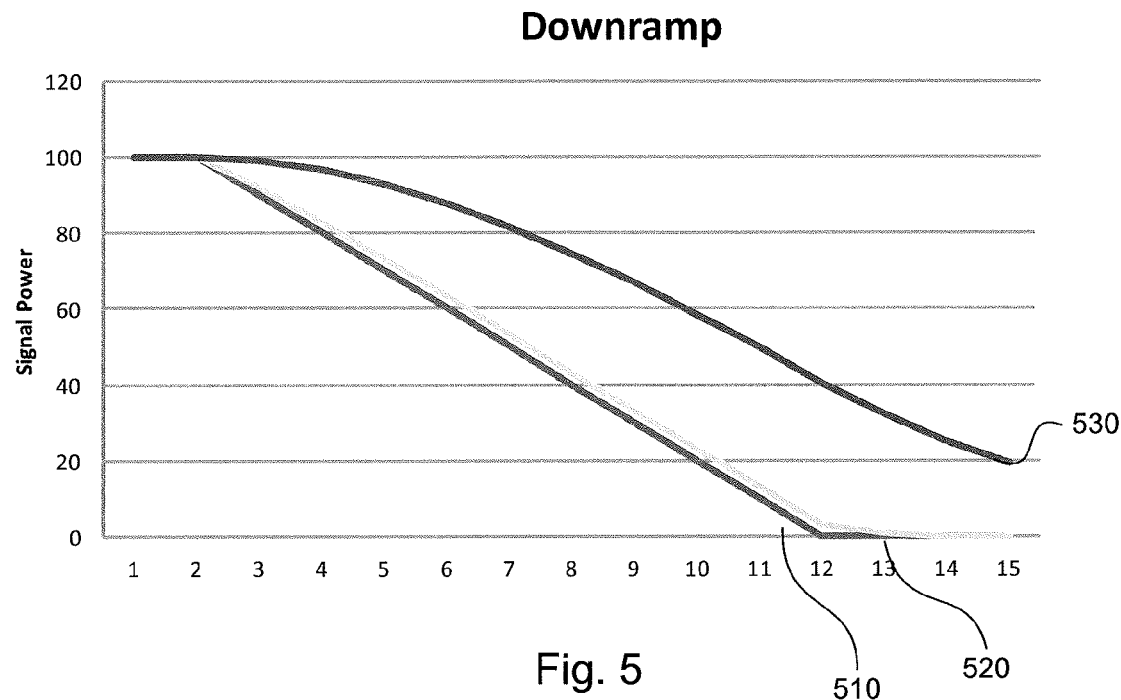
FIG. 5 shows a chart of example filter functions for a downramp signal.

FIG. 5 shows a graph of example filter functions for a downramp signal. The filter function used in FIGS. 5, 6, 7 and 8 is:

$$F(n)=(1-a)F(n-1)+a\,M(n)$$

where:
F(n) is the updated filtered measurement result
F(n−1) is the old filtered measurement result
M(n) is the latest received measurement result from physical layer measurements and
a is a coefficient configured by the network (typical value range 0 . . . 1).

The signal power in FIG. 5 is a hypothetical signal value in the range 0-100. The x-axis denotes the time in hypothetical time units. For the discussions herein it will be assumed that a UE 300 is configured to include a signal having a signal power of 70 into the active set, and to exclude a signal having a signal power of less than 40 from the active set. FIG. 5 shows three different plots, one for the received signal 510, one for a soft-filtered signal 520 (a=0.75) and one for a hard-filtered signal 530 (a=0.25). In this example the received signal 510 drops from full (100) to zero in ten time units (from time index 2 to 12) and falls below the accepted level of 40 after 6 time units (at time index 8). As can be seen the soft-filtered signal 520 follows the measured signal quite well and an apparatus 300 configured for soft filtering will exclude the cell that the measured signal originates from from the active set of the apparatus 300 shortly after time index 8, whereas the hard-filtered signal 530 does not follow the measured signal 510 but decreases more slowly and an apparatus 300 configured for hard filtering will not exclude the cell, that the measured signal originates from, from the active set of the apparatus 300 until time index 12. This allows a UE 100 incorporating the apparatus 300 to stay connected to the channel for a longer time. In the example of FIG. 5 the signal is still measurable and therefore usable (albeit at a lower signal quality) between time indexes 8 and 12 and this allows an apparatus 300 to stay connected while searching for another signal to hand over to for a longer time.

Figure 6:
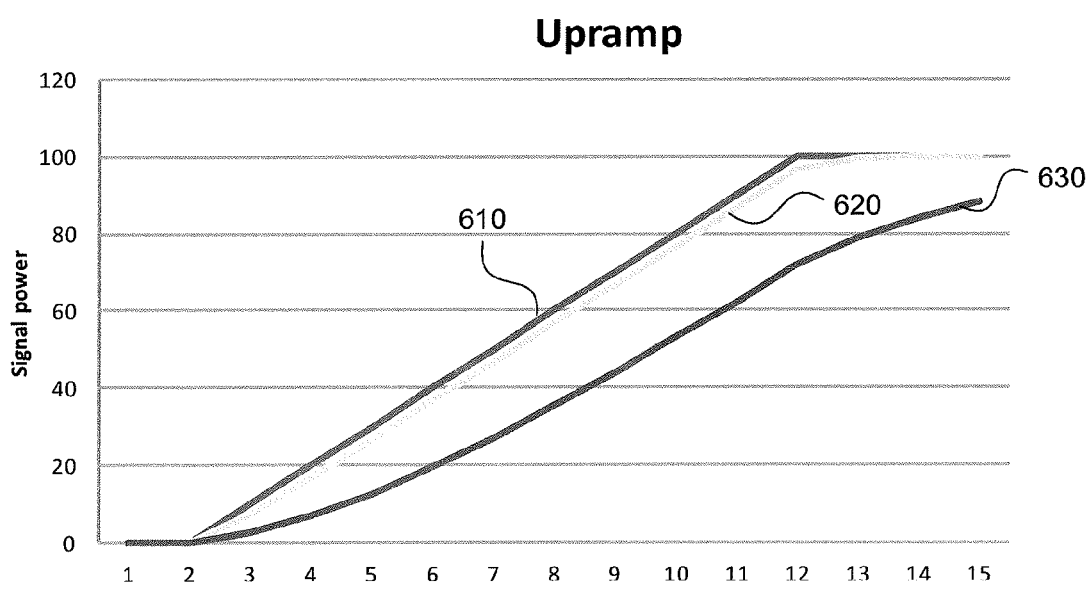
FIG. 6 shows a chart of example filter functions for an upramp signal.

Similarly, FIG. 6 shows a graph of example filter functions for an upramp signal. The signal power in FIG. 6 is, as in FIG. 5, a hypothetical signal value in the range 0-100. FIG. 6 shows three different plots, one for the received signal 610, one for a soft-filtered signal 620 (a=0.75) and one for a hard-filtered signal 630 (a=0.25). In this example the received signal 610 gains power from zero to full (100) in ten time units (from time index 2 to 12) and rises above the accepted level of 70 after 7 time units (at time index 9). As can be seen the soft-filtered signal 620 follows the measured signal quite well and an apparatus 300 configured for soft filtering will include the cell that the measured signal originates from into the active set of the apparatus 300 shortly after time index 9, whereas the hard-filtered signal 630 does not follow the measured signal 610 but gains power more slowly and an apparatus 300 configured for hard filtering will not include the cell that the measured signal originates from into the active set of the apparatus 300 until time index 12. This prevents a UE 100 incorporating the apparatus 300 configured for hard filtering to connect to the channel until time index 12. It also allows the UE 100 to only include the signal after it is certain that the signal originates from a true candidate cell, that is, a cell from which a strong signal will be received for an extended period of time.

In a typical application, each measured cell is associated with its own filtering process. Thus, adaptation can be made for each measured cell individually depending on for example the current environmental operating parameters of that particular cell.

In one embodiment the apparatus 300 may be configured to factor in the operating parameter whether the active set holds many cells or only a few cells. In a scenario where the active set comprises many cells, the apparatus 300 may be less cautious as there are cells available to fall back on, should one cell prove to be falsely ascertained. Thus, it may not be crucial to quickly detect a new cell and a filter coefficient may be set to a low value accordingly. Furthermore, it might not be crucial to keep a fading cell and a filter coefficient may be set to a high value accordingly. Thus, a diminishing cell may be released soon after it starts to decrease in power making room in the active cell list for new emerging cells. In a scenario where the active set only comprises one or a few cells, the apparatus need to be more cautious as loss of one cell may lead to that an ongoing connection is dropped. Thus, it may be crucial to quickly detect a new cell and a filter coefficient may be set to a high value accordingly. Furthermore, it might be important to not lose a temporarily fading cell and a filter coefficient may be set to a low value accordingly.

In one such embodiment the apparatus 300 is thus configured to determine if the active set contains a number of cells that is lower than a first threshold value and if so adjust the filter coefficients accordingly. And, the apparatus 300 may further be configured to determine if the active set contains a number of cells that is higher than a second threshold value and if so adjust the filter coefficients accordingly.

The apparatus 300 may further be configured to determine the adaptive filter coefficient based on whether the detected signal is in upramp or downramp. The apparatus 300 is configured to determine that the detected signal is in upramp or downramp based on one or a combination of the following: determining a derivate for the detected signal. determining a difference between two samples (X(n)–x(n–1)), determining the sign of such a difference and tracking the difference or the sign of a difference over several samples.

The apparatus 300 may be configured to filter cautiously by filtering softly on upramp signals, and hard on downramp signals in environments where the consequences of losing a cell or estimating a cell incorrectly may lead to that the UE 100 loses coverage and potentially drops an ongoing communication. Examples of such environments will be exemplified below. The apparatus 300 may be further configured to filter hard on upramp signals, and softly on downramp signals in environments where the consequences of losing a cell or estimating a cell incorrectly are not detrimental to the operation of the UE 100 incorporating the apparatus 300.

The operation of the apparatus 300 will be described below through a series of exemplifying radio scenarios.

Figure 1:
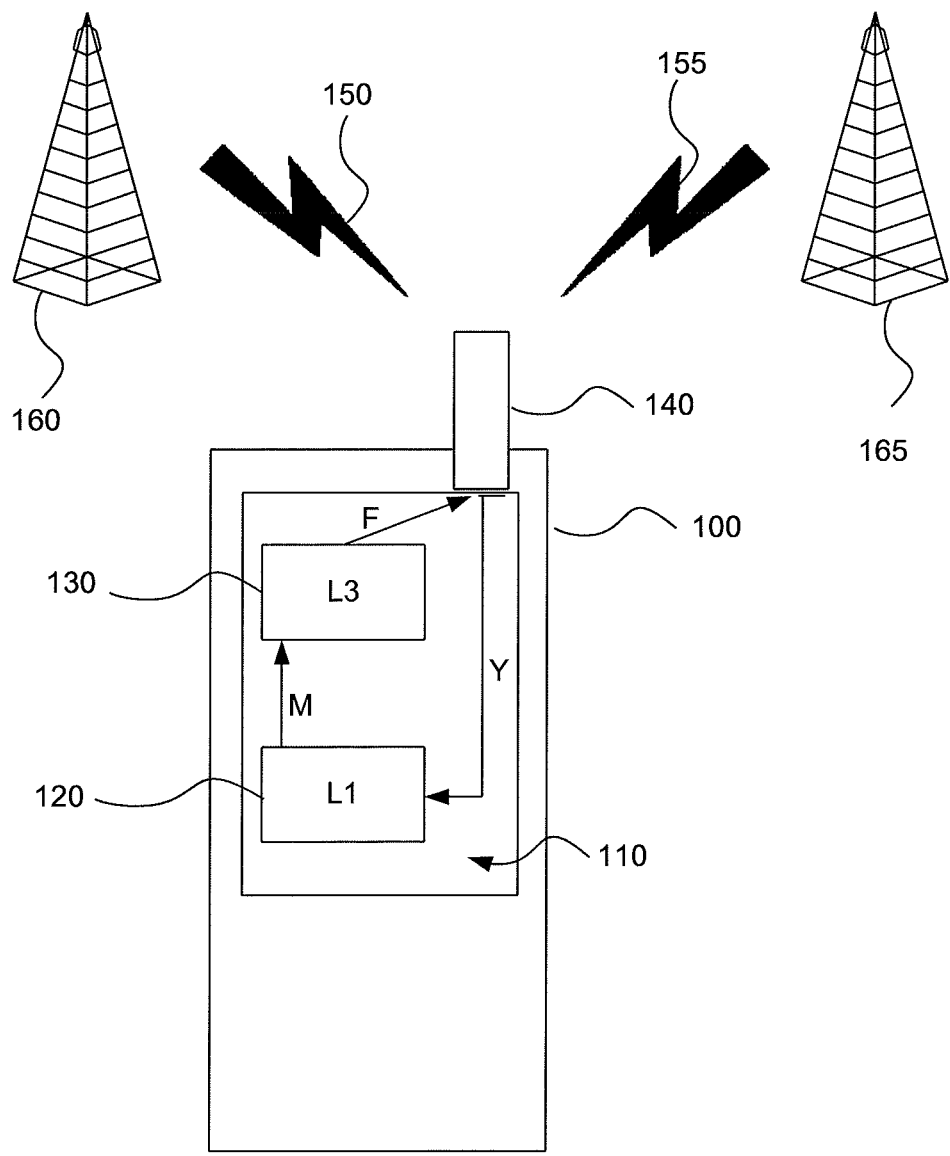
FIG. 1 shows a schematic view of a mobile telecommunications device comprising an apparatus in a network environment.

In a scenario where an active set comprises many cells and it is detected that a signal strength for one of the cells is declining, i.e. the signal (referenced 150 in FIG. 1) is possibly in downramp, such as is disclosed in FIG. 5, the apparatus 300 may be configured to filter softly, that is, set the adaptive filter coefficient to a high value. This allows the measured signal strength to drop quickly and the corresponding cell to be excluded from the active set to make room for another stronger signal to be included in the active set more readily. This allows the apparatus 300 to maintain an active set of viable strong signals and their corresponding cells which set is updated frequently to make sure that there is a viable (as in strong and stable) base station 160, 165, 440 to connect to should so be necessary.

In a scenario where an active set comprises only a few cells and it is detected that a signal strength for a new cell is increasing, i.e. the signal 155 is in upramp which is indicative of a new base station 165 coming in to range such as is disclosed in FIG. 6, the apparatus 300 may be configured to filter softly, that is set the adaptive filter coefficient to a high value. This enables the apparatus 300 to quickly detect a new base station 165 coming in to range and possibly include it in its active set as a candidate to be handed over to. This allows for fast detection of possible hand over candidates in a situation where a hand over might be needed with only a short forewarning.

In a scenario where an active set comprises only a few cells and it is detected that a signal strength for one of the cells is declining, i.e. the signal 150 is possibly in downramp, such as in FIG. 5, the apparatus 300 may be configured to filter hard, that is, set the adaptive filter coefficient to a low value. This allows the measured signal strength to drop more slowly and allows the apparatus to stay connected to a first base station on that signal for as long as possible giving more time to find another more suitable second base station 165 to connect to.

In a scenario where an active set comprises many cells and it is detected that a signal strength for a new cell is increasing, i.e. the signal 155 is in upramp, such as in FIG. 6, which is indicative of a new base station 165 coming in to range, the apparatus 300 may be configured to filter hard, that is set the adaptive filter coefficient to a low value. This enables the apparatus 300 to make sure that a new base station 165 coming in to range provides a stable connection.

Figure 7:
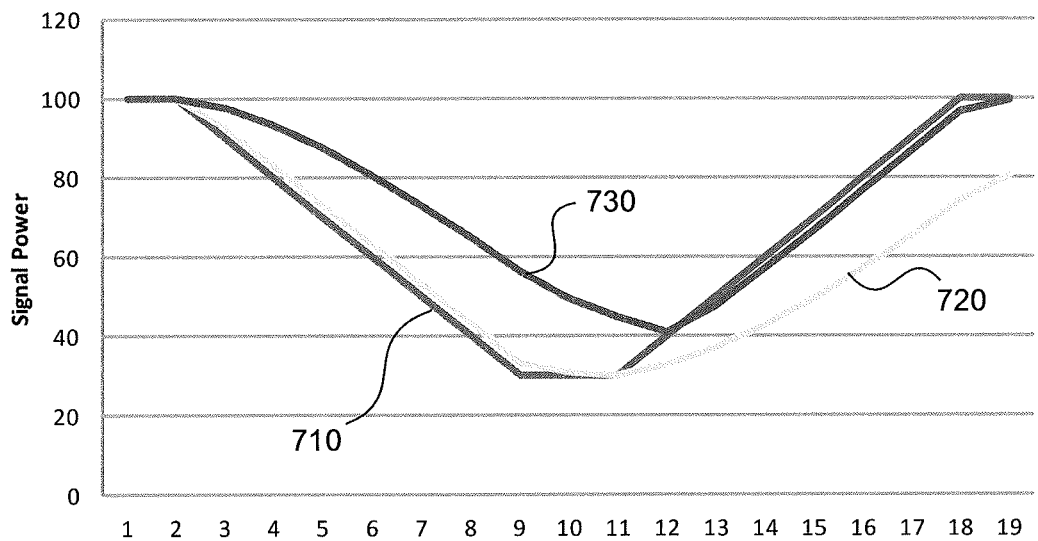
FIG. 7 shows a chart of example adaptive filter functions for a signal having a downramp followed by an upramp according to one embodiment of the teachings of this application.

FIG. 7 shows an example situation where a received signal 710 experiences a temporary drop in signal power. The first filtered signal 720 corresponds to a signal that is filtered by an apparatus 300 being in a situation where it can afford to loose a cell or two, such as an apparatus 300 having a full active set. As the apparatus 300 determines that the received signal 710 starts to decrease in power (downramp) the apparatus 300 is configured to filter softly (a=0.75) as is indicated by the first filtered signal 720 and as the first filtered signal 720 drops below 40 the cell that the received signal 710 is received from is excluded from the active set at time index 8. As the apparatus 300 determines that the received signal 710 is increasing in power (upramp) the apparatus 300 is configured to filter hard (a=0.25) and the first filtered signal 720 does not follow the received signal any longer and the received signal 710 is not included into the active set as it rises above the level 40 at time index 11. This provides an apparatus that is less trigger-happy when it comes to including cells to the active set. This saves network resources.

Likewise, the second filtered signal 730 corresponds to a signal that is filtered by an apparatus 300 being in a situation where it can not afford to loose a cell or two, such as an apparatus 300 having perhaps only one cell available. As the apparatus 300 determines that the received signal 710 starts to decrease in power (downramp) the apparatus 300 is configured to filter hard (a=0.25) as is indicated by the second filtered signal 730 not following the received signal 710 and even as the received signal 710 drops below 40 the apparatus 300 still maintains its connection with the cell that the signal 710 is received from. As the apparatus 300 determines that the received signal 710 is increasing in power (upramp) the apparatus 300 is configured to filter softly (a=0.75) and the second filtered signal 720 aligns with the received signal 710. In this example the connection with the cell is maintained all through the temporary decrease in power and this provides an apparatus 300 that maintains a stable connection even in an environment where the signal level is low and there are no or few other cells available.

Figure 8:
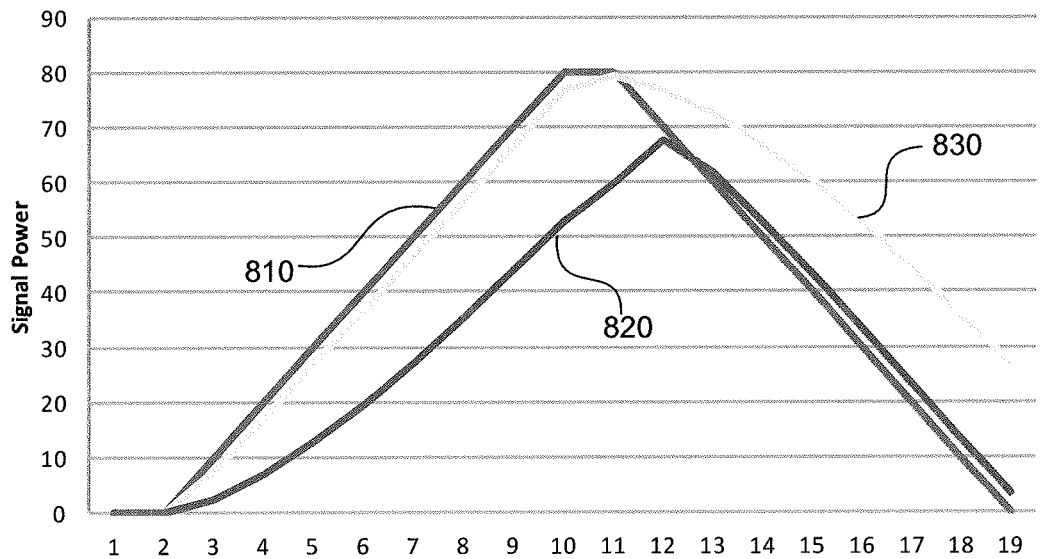
FIG. 8 shows a chart of example adaptive filter functions for a signal having an upramp followed by a downramp according to one embodiment of the teachings of this application.

FIG. 8 shows an example situation where a received signal 810 experiences a temporary rise in signal power. This can be the situation when a UE 100 travels past a base station 150. The first filtered signal 820 corresponds to a signal that is filtered by an apparatus 300 being in a situation where the cell can afford to not include a cell or two (and/or it can afford to loose a cell or two), such as an apparatus 300 having a full active set. As the apparatus 300 determines that a received signal 810 starts to increase in power (upramp), or comes into range, the apparatus 300 is configured to filter hard (a=0.25) as is indicated by the first filtered signal 820 and even as the received signal 810 rises above 70 the cell that the received signal 810 is received from is not included into the active set. As the apparatus 300 determines that the received signal 810 is decreasing in power (downramp) the apparatus 300 is configured to filter softly (a=0.75) and the first filtered signal 820 aligns with the received signal 810. This provides an apparatus 300 that is less inclined to (or trigger-happy) include cells to the active set which save network resources.

Likewise, the second filtered signal 830 corresponds to a signal that is filtered by an apparatus 300 being in a situation where it can not afford to loose a cell or two, such as an apparatus 300 having perhaps only one cell available. As the apparatus 300 determines that the received signal 810 starts to increase in power (upramp) the apparatus 300 is configured to filter hard (a=0.25) as is indicated by the second filtered signal 830 following the received signal 810 and as the received signal 810 rises above 70 the apparatus 300 will include the cell that the received signal 810 is received from and establish a connection with the cell. As the apparatus 300 determines that the received signal 810 is decreasing in power (downramp) the apparatus 300 is configured to filter (a=0.25) softly and the second filtered signal 830 no longer follows the received signal 810. In this example the connection with the cell is maintained for a short while (time index 9 to 14) allows the apparatus 300 time to maintain a connection while searching for other cells to hand over to.

It should be noted that even though the examples above show an adaptation of the filter function by changing the filter coefficient it is possible to adapt the filter in other manners and also to set the filter coefficient to other values than the values given in the examples herein.

The apparatus 300 may be further configured to determine at least one filter coefficient based on a main feature of the radio channel. The apparatus 300 is further configured to measure a signal strength for a signal 150, 155 received from a base station 160, 165, 440. For a logarithmic scale, that is measuring signal strength in decibels (dB), the radio channel measurements contain prominent fading dips, but less prominent "fading peaks". In other words, the maximum level of a signal strength is only a few decibels larger than the mean value for the signal, while the dips could be several decibels smaller, in fact, several tens of decibels smaller than the mean value for the signal. Therefore, as it is determined that one or a few consecutive samples have a strength that is higher than the mean value for the signal or the filtered signal which is typically indicative of a trend (for example due to path loss reduction), the controller of the apparatus 300 may be configured to adapt (e.g. increase) the filter coefficient. In one embodiment the apparatus 300 may be configured to adapt the filter coefficient if the measured signal has a strong measurement sample that is larger than the average value+an offset, x (x=2 dB for example). The apparatus 300 is then configured to assign a filter coefficient that is larger than the ordinary filter coefficient (being 1/N for an FIR implementation).

The apparatus 300 may also be configured to take into account the radio channel characteristic that the path loss is dependent on the carrier frequency $f_c$. Lower carrier frequencies generally have larger coverage areas than higher carrier frequencies. For example a carrier frequency of 700 MHz typically has a larger coverage than a carrier frequency of 3 GHz, given the same output power. Since high carrier frequencies above for example 2 GHz have a larger pathloss than low carrier frequencies below for example 1 GHz, in case of IRAT/IF measurements, the apparatus 300 may be configured to adapt the filter coefficient(s) accordingly. For example, cells using high carrier frequencies (e.g. $f_c$=3 GHz) might relate to measurements that increase/decrease faster than lower carrier frequencies (e.g. $f_c$=700 MHz) when a mobile device comprising an apparatus 300 is moving towards/away from a cell. To be able to react aptly to these changes the filter coefficient should be set accordingly. The apparatus 300 may be configured to set a higher filter coefficient for high carrier frequencies (3 GHz), and to set a lower filter coefficient for lower carrier frequencies (700 MHz). The apparatus 300 is thus enabled to react accordingly using an adaptive filter length.

Furthermore, the apparatus 300 may also be configured to assign different filters for different cells. As has been discussed above, in the case where there are few cells in the active set (such as in WCDMA) a new cell coming into range is given higher impact on large measurement samples in order to include stronger cells more quickly in the active set. A declining cell might be strongly filtered (low coefficient) to keep it longer if the decline is only temporary, such as in FIG. 7. However, in the case where there are many cells in active set or the active set is full, the need for replacing new stronger cells might not be equally important. In this case, the filtering for neighboring cells might not be adapted or the filter coefficient is set low. If the filtering is not adapted the filter uses a default filter coefficient which is determined by the apparatus 300. In some situations, a declining cell might be softly filtered (high coefficient) to not keep it in the active set for too long to make room for new cells having a signal growing in signal power.

In a scenario where the apparatus 300 is configured to operate using dual carrier frequencies (utilizing more than one carrier to obtain a higher data transfer rate), the apparatus 300 is configured to operate using a primary cell and a secondary cell (being of different carrier frequencies and/or of different RATs). The primary cell is typically chosen to be the cell having the highest data transfer rate and possibly being the most advanced or modern RAT. In such a scenario it is important to not lose the primary cell and the apparatus 300 may therefore be configured to filter the signal 150 from the primary cell's base station 160 harder (having a low filter coefficient). It is, however, not so crucial to maintain the secondary cell, especially not when the secondary cell's data transfer rate is much lower than the primary cell's data transfer rate as the contribution from the secondary cell is then relatively small, and the apparatus 300 can afford to filter less cautiously. The apparatus 300 may be configured to set a filtering coefficient for the secondary cell's signal to a higher value than the filter coefficient for the primary cell's signal. This enables the apparatus 300 to be able to quickly find alternative secondary cells that possibly afford a higher data transfer rate thereby enabling the apparatus 300 to potentially increase its over all data transfer rate while maintaining the connection to the primary cell ensuring that a high data transfer rate is available.

Another scenario where the apparatus 300 may be configured to adapt filter coefficients differently for different carriers is when one RAT is prioritized. The RAT may, for example, be prioritized by the user of the UE 200 or by a service provider. The prioritization of a RAT may, for example, enable the apparatus to always choose a RAT affording the highest data transfer rate or the cheapest communication costs to name a few possibilities. The apparatus 300 may thus be configured to set the adaptive filter coefficient to high values for upramp signals for prioritized RATs and possibly to set the adaptive filter coefficient to low values for upramp signals for RATs that are not preferred. This enables the apparatus 300 to quickly find cells offering the prioritized RATs and thereby allowing for faster connection to such cells. To enable the apparatus to maintain a connection to a prioritized RAT for an extended time the apparatus 300 may be configured to set the adaptive filter coefficient to low values for downramp signals for prioritized RATs to allow the apparatus 300 to maintain the connection to the prioritized RAT. The prioritized RAT is provided by the network.

To enable that a connection is not lost completely the apparatus 300 may be configured to set the adaptive filter coefficient to a high value if it is detected that the received signal has a low quality. To enable a maintained connection even when the preferred RAT's signal has a low quality the apparatus 300 may be configured to set the adaptive filter coefficient for a non-preferred RAT to a high value if it is detected that the received signal has a low quality. This allows for enabling quick detection of emerging cells (in particular for non-active cells).

Figure 9:
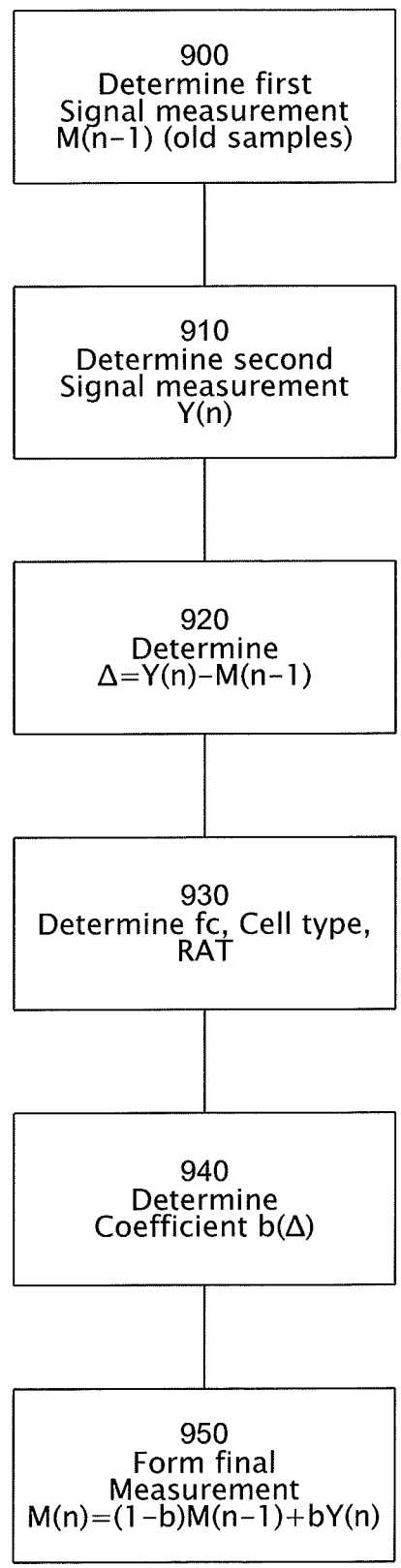

FIG. 9 shows a generic flowchart of an example method according to herein. In FIG. 9, the L1 filter is adapted, and it is furthermore assumed an IIR filter implementation is used. The terminal/transceiver have determined (900) old filtered signal measurements M(n−1) for a particular cell operating on a certain carrier frequency using a specific RAT, here called first measurements. Then a new (second) measurement Y(n) is determined based on the received samples (910). The difference A between the first and second sample is determined (920). A control unit determines a filter coefficient (time constant) b (940) that is dependent on the difference and optionally also on one of a carrier frequency, RAT and/or cell type (active/serving neighboring etc) as has been described above (930). Finally a new (final for time n) measurement sample M(n) is determined (950).

In one embodiment the apparatus 300 is configured to set a sample time length of 40-70 ms. The sample time to be set may be dependent on the RAT and it is chosen so that the sample time, that is the sample time length multiplied by the number of samples, is approximately 200 ms. For WCDMA specifying 6 samples a sample time length of 40 ms is chosen resulting in a sample time of 240 ms. For LTE specifying 3 samples a sample time length of 70 ms is chosen resulting in a sample time of 210 ms.

The apparatus 300 may thus be configured to determine a first signal measurement, M(n−1), consisting of at least one signal measurement received/obtained at earlier time steps, determine a second signal measurement based on current received signal, Y(n), determine a final signal (e.g. L1 or L3) measurement based on the first signal measurement and the second measurement and at least one of the following operating parameters:

difference of the first and second signal measurement {Y(n)−M(n−1)} (or the sign of the difference)
carrier frequency {t}
Radio Access Technology (WCDMA/LTE/GSM) (RAT)
whether the cell is in the active set (or serving cell) or in detected/monitored set (cell type)
how many cells are in the active set, and
whether cell is a primary or secondary cell (for Dual carrier).

In one embodiment the apparatus 300 may be configured to filter or otherwise track the sign or difference over two or more samples before allowing the difference to affect the filter coefficient. Tracking of the difference and/or sign allows a trend in the measurement value to be followed. For example, one might want to see that more than one difference has a positive (or negative) value before increasing (or decreasing) the coefficient value and thereby allowing an emerging cell to be detected more quickly.

The apparatus 300 is further configured to determine the final measurement set based on the equation:

$$M(n)=(1-b)M(n-1)+b\ Y(n),$$

where b is a function of operating parameters such as e.g. $f_c$, RAT, cell type, (Y(n)−M(n−1) and/or Y(n)−Y(n−1)).

The apparatus 300 may be further configured to make the measurements on a second signal received from a second base station 165 and to determine (or send a measurement report to a base station for an external determination of) whether a hand over event shall be triggered based on a comparison of the final signal measurement of the first and second cell.

In one embodiment the apparatus 300 is configured to set the filter coefficient (b) as an increasing function of {Y(n)−M(n−1)}. In one embodiment the apparatus 300 is configured to set the filter coefficient (b) as an increasing (or alternatively decreasing) function of the carrier frequency for a given {Y(n)−M(n−1)}. This allows for a real-time adaptation of the filter function that takes into account the stability of a trend. For example, a hard filtered signal that shows a steady trend may be more softly filtered to allow the filtered signal to align with the measured signal for a more true value.

Figure 10:
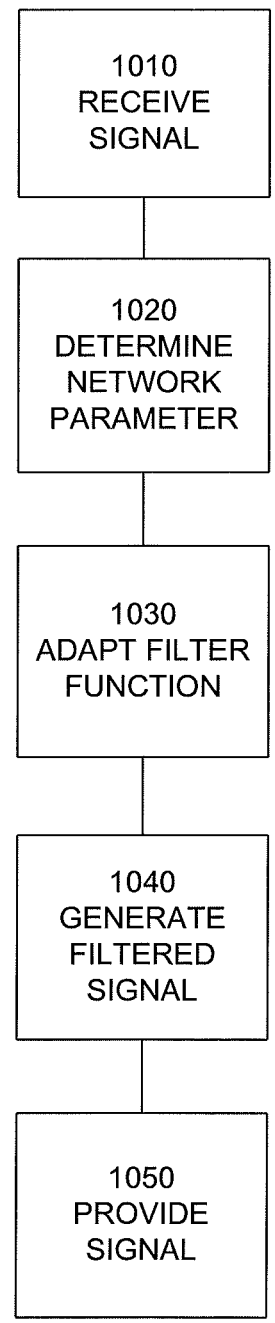
FIG. 10 shows a flowchart for a general method according to the teachings of this application.

FIG. 10 shows a flowchart of a general method according to the teachings herein. An apparatus receives a radio frequency signal 1010 and determines a operating parameter 1020. The operating parameter can be one or several taken from a group comprising carrier frequency, RAT, difference in received signal, difference between received signal and previous provided signal and cell type, such as primary cell, secondary cell, serving cell, detected cell or monitored cell. A filter function is adapted 1030 according to the operating parameter and a filtered signal is generated 1040 and provided 1050 for RRM procedures.

A method, an apparatus or a computer program product according to the teachings herein provides a manner of adapting smoothing/filtering of RRM related measurements according to an environment.

An implementation based on the teachings herein may be configured to consider specific characteristics of the RRM-related measurements and may be capable of detecting beneficial cells faster than the traditional implementations and at the same time be able to filter out temporary fading of measured signals thereby providing for a more stable radio connection.

The teachings of this application provide an apparatus and a method that is capable of adjusting the filter coefficients according to the network environment thereby providing an improved handling of the received signals.

One benefit of the teachings herein is that an apparatus is able to maintain a connection that would otherwise be discarded when this is useful depending on the circumstances. This allows for stable connections using less network resources.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. An apparatus for use in a telecommunications system, said apparatus comprising:
a controller configured
to receive a first radio frequency signal from a first cell of the telecommunications system,
to measure the received radio frequency signal,
to adapt a first filter function according to a number of cells in an active set for the apparatus;
to adapt a second filter function for a second measured cell that a second radio frequency signal is received from;
to generate a filtered signal by applying said adapted first filter function to the received radio frequency signal; and
to provide said filtered signal for radio resource management.

2. The apparatus according to claim 1, wherein said controller is further configured to detect a change in said number of cells in the active set and/or other operating parameter and to adapt the filter function according to the change in real-time.

3. The apparatus according to claim 1, wherein said controller is further configured to adapt said filter function by changing a filter coefficient.

4. The apparatus according to claim 1, wherein said controller is further configured to adapt a second filter function according to an operating parameter and apply said second filter function to said filtered signal.

5. The apparatus according to claim 1, wherein said controller is further configured to determine whether a received signal strength of said received radio frequency signal is increasing or decreasing and adapt said filter function accordingly.

6. The apparatus according to claim 1, wherein said controller is further configured to adapt said first filter function for a first measured cell that said received radio frequency signal is received from.

7. The apparatus according to claim 1, wherein an operating parameter is used to adapt the first filter function, the operating parameter being related to at least one of a carrier frequency, a Radio Access Technology, RAT, among possible RATs, a difference between a first and a second measurement of the received radio frequency signal, a difference between a measurement of the received radio frequency signal and a filtered signal, and whether said received radio frequency signal is received from a primary cell, a secondary cell, a serving cell, or a detected cell.

8. The apparatus according to claim 7, wherein said controller is further configured to, if the operating parameter is related to carrier frequencies, to adapt said first filter function using a first filter time constant for a first carrier frequency and a second filter time constant for a second carrier frequency, wherein the first carrier frequency is lower than the second carrier frequency and the first filter time constant is higher than the second filter time constant.

9. The apparatus according to claim 7, wherein said controller is further configured, if the operating parameter is related to primary and secondary cells, to adapt said first filter function using a first filter time constant for a primary cell and a second filter time constant for a secondary cell, wherein the first filter time constant is lower than the second filter time constant.

10. The apparatus according to claim 7, wherein controller is further configured if the operating parameter is related to radio access technologies, to determine priorities of radio access technologies and to adapt said first filter function using a first filter time constant for a first priority of a first radio access technology and adapt said first filter function using a second filter time constant for a second priority of a second radio access technology, wherein if the first priority is higher than the second priority, then the first filter time constant is higher than the second filter time constant.

11. The apparatus according to claim 7, wherein said controller is further configured, if the operating parameter is related to a difference between a first measurement and a second measurement of the received radio frequency signal, to track said difference for a number of samples, to determine whether the difference is consistent, and, if the difference is consistent over the tracked samples, to adapt said filter function accordingly.

12. A mobile communications device comprising an apparatus according to claim 1.

13. A method for use in a telecommunications system said method comprising:
receiving a first radio frequency signal from the telecommunication system;
measuring the received radio frequency signal;
adapting a first filter function according to a number of cells in an active set for the apparatus;
adapting a second filter function for a second measured cell that a second radio frequency signal is received from;
generating a filtered signal by applying said adapted first filter function to the received radio frequency signal, and
providing said filtered signal for radio resource management.

14. The method according to claim 13 further comprising determining whether a received signal strength of said received radio frequency signal is increasing or decreasing and further adapting said first filter function accordingly.

15. A non-transitory computer readable medium storing a computer program comprising executable instructions, the computer program being loadable into a data-processing unit and adapted to cause execution of the method according to claim 13 when the computer program is run by the data-processing unit.

16. The method of claim 13, further comprising adapting said first filter according to an operating parameter related to at least one of
a carrier frequency,
a Radio Access Technology, RAT, among possible RATs, a difference between a first and a second measurement of the received radio frequency signal, a difference between a measurement of the received radio frequency signal and a filtered signal, and whether said received radio frequency signal is received from a primary cell, a secondary cell, a serving cell, or a detected cell.

\* \* \* \* \*